(12) United States Patent
Cho et al.

(10) Patent No.: US 7,903,201 B2
(45) Date of Patent: Mar. 8, 2011

(54) LIQUID CRYSTAL DISPLAY DEVICE

(75) Inventors: Joo-woan Cho, Seoul (KR); Du-hwan Chung, Gyeonggi-do (KR); Tae-seok Jang, Seoul (KR); Seong-sik Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 515 days.

(21) Appl. No.: 11/930,901

(22) Filed: Oct. 31, 2007

(65) Prior Publication Data

US 2008/0117351 A1 May 22, 2008

(30) Foreign Application Priority Data

Nov. 20, 2006 (KR) .................. 10-2006-0114592

(51) Int. Cl.
*G02F 1/1335* (2006.01)
*G02F 1/1333* (2006.01)
*F21V 7/04* (2006.01)
(52) U.S. Cl. .............. 349/67; 349/61; 349/58; 362/561
(58) Field of Classification Search .............. 349/67, 349/64, 61, 58; 362/561
See application file for complete search history.

(56) References Cited

U.S. PATENT DOCUMENTS

| 7,578,610 | B2 * | 8/2009 | Sakamoto et al. | 362/634 |
|---|---|---|---|---|
| 2003/0112626 | A1 | 6/2003 | Yoo et al. | |
| 2004/0114372 | A1 * | 6/2004 | Han et al. | 362/330 |
| 2004/0156183 | A1 | 8/2004 | Kim | |
| 2005/0057946 | A1 * | 3/2005 | Kim | 362/561 |
| 2005/0265020 | A1 * | 12/2005 | Kim | 362/225 |
| 2006/0103774 | A1 * | 5/2006 | Han et al. | 349/58 |
| 2006/0133108 | A1 | 6/2006 | Choi et al. | |

FOREIGN PATENT DOCUMENTS

CN 1790065 A 6/2006

\* cited by examiner

*Primary Examiner* — W. Patty Chen
(74) *Attorney, Agent, or Firm* — Cantor Colburn LLP

(57) ABSTRACT

A liquid crystal display device includes a liquid crystal display panel, a plurality of light sources disposed behind the liquid crystal display panel, and a cover which accommodates the light sources. The cover includes a first cover part parallel with the liquid crystal display panel and disposed behind the light sources, a second cover part bent upward from an end portion of the first cover part, and a third cover part bent upward from the first cover part which faces the light sources. An end portion of the light sources is disposed between the second cover part and the third cover part.

19 Claims, 8 Drawing Sheets

FIG. 6

| 564 → 592 5.0% | 560 → 568 1.4% | 541 → 556 2.8% |
| --- | --- | --- |
| 608 → 656 7.9% | 613 → 640 4.4% | 580 → 616 6.2% |
| 569 → 609 7.0% | 592 → 616 4.1% | 591 → 624 5.6% |

LIQUID CRYSTAL DISPLAY DEVICE

This application claims priority to Korean Patent Application No. 2006-0114592, filed on Nov. 20, 2006, and all the benefits accruing therefrom under 35 U.S.C. §119, the contents of which in its entirety are herein incorporated by reference.

BACKGROUND OF INVENTION (a) Field of Invention

The present invention relates to a liquid crystal display device.

(b) Description of the Related Art

Flat panel display devices, such as liquid crystal display ("LCD") devices, plasma display panels ("PDPs"), and organic light emitting diodes ("OLEDs"), have become widely used in place of cathode ray tubes ("CRTs").

An LCD device includes an LCD panel. The LCD panel includes a first substrate where thin film transistors ("TFTs") are formed, a second substrate which faces the first substrate, and a liquid crystal layer disposed between the substrates. The LCD panel does not emit light by itself, and thus a backlight unit is provided behind the first substrate to provide light. Transmittance of the light irradiated from the backlight unit is adjusted according to the alignment of liquid crystals.

The backlight unit may be either an edge type or a direct type based upon a position of a light source with respect to the backlight unit.

In the direct type backlight unit, a plurality of light sources is disposed behind the LCD panel to cover the entire area of the LCD panel, and an optical plate is disposed between the light sources and the LCD panel. The direct type backlight unit provides higher brightness, and thus it is used for large-screen LCD devices.

The direct type backlight unit typically uses a lamp as its light source. The direct type backlight unit includes a side mold to accommodate an end portion of the lamp and to support the optical plate. However, conventional side molds require somewhat complex configuration in order to support elements of the backlight unit. In addition, these side molds prevent efficient radiation of heat generated from the lamp.

BRIEF SUMMARY OF THE INVENTION

Accordingly, it is an aspect of the present invention to provide a LCD device having a simplified configuration.

In an exemplary embodiment of the present invention, a liquid crystal display device includes a liquid crystal display panel a plurality of light sources disposed behind the liquid crystal display panel and a cover which accommodates the light sources. The cover includes a first cover part parallel with the liquid crystal display panel and disposed behind the light sources, a second cover part bent upward from an end portion of the first cover part, and a third cover part bent upward from the first cover part which faces the light sources. An end portion of the light sources is disposed between the second cover part and the third cover part.

The liquid crystal display device may further include a reflection sheet that includes a first sheet part to cover at least a portion of the first cover part, and a second sheet part to cover at least a portion of the third cover part.

The cover may further include a fourth cover part which is bent from an end portion of the third cover part and extends toward the second cover part, and is parallel with the liquid crystal display panel.

The liquid crystal display device may further include an optical plate disposed between the liquid crystal display panel and the light sources. The fourth cover part supports an end portion of the optical plate.

The reflection sheet may further include a third sheet part extending from the second sheet part and disposed between the fourth cover part and the optical plate.

A plurality of third cover parts may be provided and disposed in a transverse direction to a lengthwise direction of the light sources, and the light sources may be disposed between neighboring third cover parts.

A cut-off part may be formed in the first cover part to correspond to the third cover part.

The liquid crystal display device may further include a light blocking member adhered to a rear surface of the first cover part to cover the cut-off part.

The third cover part may form an obtuse angle with the first sheet part.

The liquid crystal display device may further include a light source socket which is connected to the end portion of the light sources to transmit power and may include at least a portion disposed between the second cover part and the third cover part.

The liquid crystal display device may further include an inverter disposed on a rear surface of the first cover part and a socket through a hole which is adjacent to the cut-off part and formed in the first cover part. The light source socket may include a socket body connected to the end portion of the light sources and an inverter connecting part exposed outside the cover through the socket through the hole and connected to the inverter.

The liquid crystal display device may further include a mold frame that includes a first mold part supported by the second cover part and a second mold part extending from the first mold part over the optical plate. An end portion of the liquid crystal display panel may be seated on the second mold part.

Another exemplary embodiment of a liquid crystal display device includes a liquid crystal display panel, a plurality of light sources disposed behind the liquid crystal display panel, an optical plate disposed between the liquid crystal display panel and the light sources, a cover which accommodates the light source and supports an end portion of the optical plate, and a reflection sheet which covers the cover facing the optical plate.

The cover may include a first cover part parallel with the liquid crystal display panel and disposed behind the light sources, a second cover part bent upward from an end portion of the first cover part, a third cover part bent upward from the first cover part which faces the light sources, and a fourth cover part which is bent from an end portion of the third cover part and extends toward the second cover part, and is parallel with the liquid crystal display panel. An end portion of the optical plate may be seated on the fourth cover part.

A plurality of third cover parts may be provided and disposed in a transverse direction to a lengthwise direction of the light sources, and the light sources may be disposed between neighboring third cover parts.

A cut-off part may be formed in the first cover part to correspond to the third cover part.

The liquid crystal display device may further include a light blocking member adhered to a rear surface of the first cover part to cover the cut-off part.

The third cover part may form an obtuse angle with the first sheet part.

The liquid crystal display device may further include a light source socket which is connected to the end portion of the light sources to transmit power and may include at least a portion disposed between the second cover part and the third cover part.

The liquid crystal display device may further include an inverter disposed on a rear surface of the first cover part and a socket through a hole formed adjacent to the cut-off part in the first cover part. The light source socket may include a socket body connected to the end portion of the light sources and an inverter connecting part exposed outside the cover through the socket through the hole and connected to the inverter.

BRIEF DESCRIPTION OF THE DRAWINGS

The above and other aspects, features, and advantages of the present invention will become apparent and more readily appreciated from the following description of the exemplary embodiments, taken in conjunction with the accompanying drawings, in which:

FIG. 6 is a diagram illustrating a brightness distribution in the LCD device according to the first exemplary embodiment of the present invention;

DETAILED DESCRIPTION OF THE INVENTION

Figure 1:
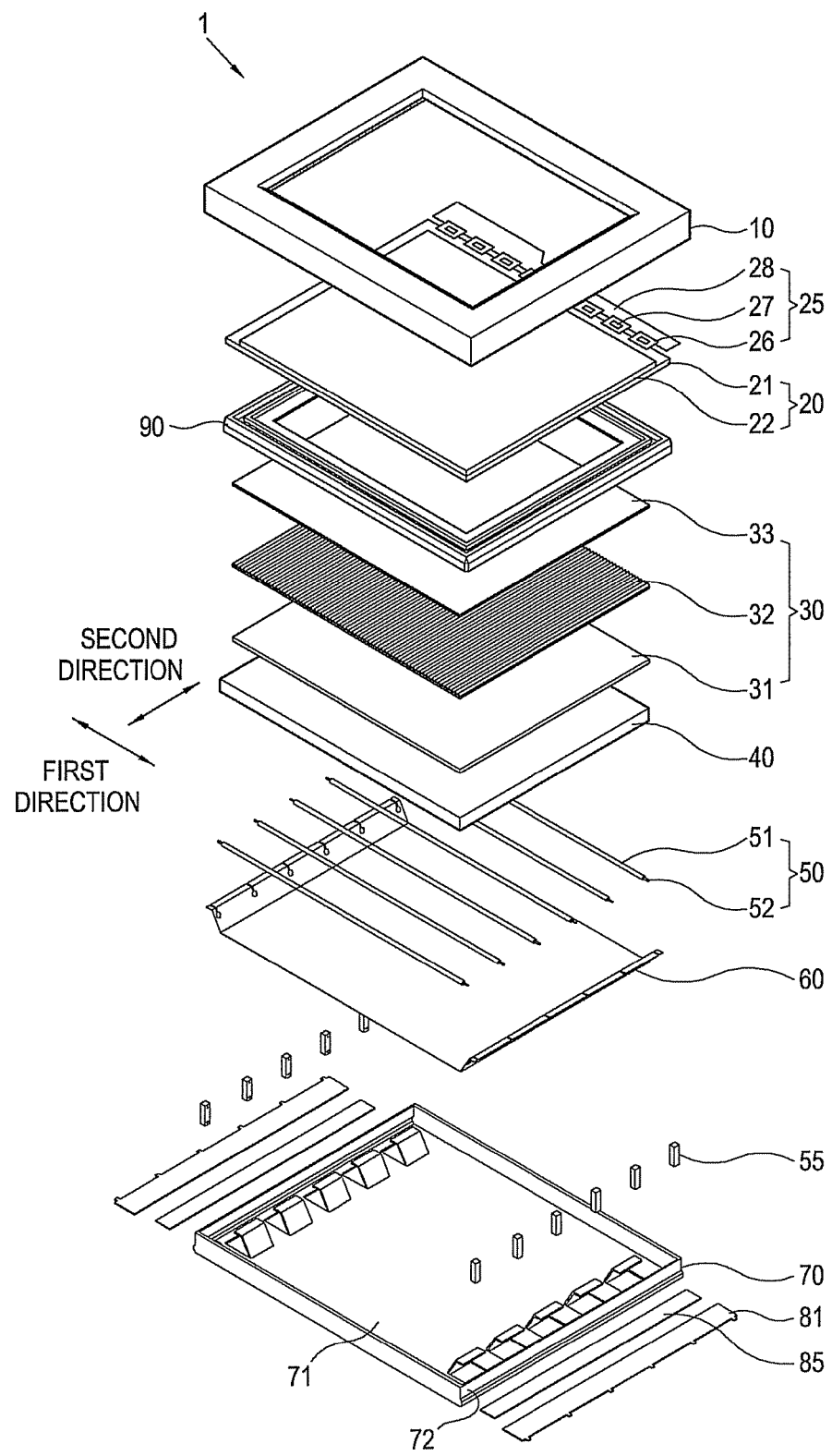
FIG. 1 is an exploded perspective view of an LCD device according to a first exemplary embodiment of the present invention.

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Figure 2:
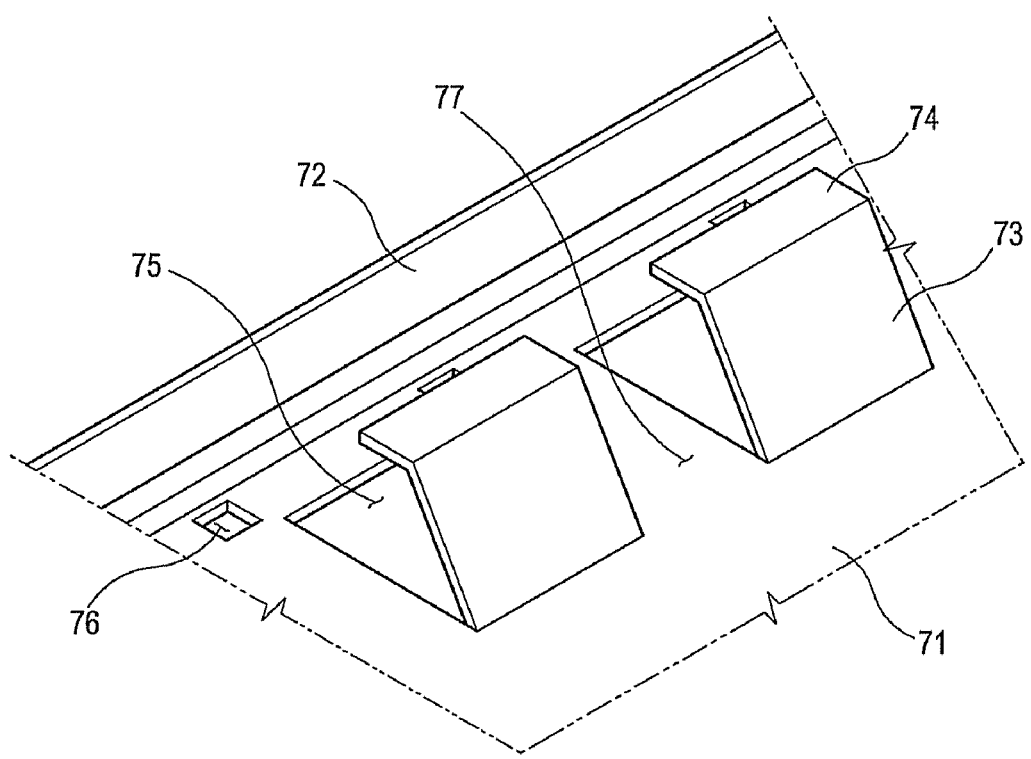
FIG. 2 is a perspective view of a portion of a lower cover in the LCD device according to the first exemplary embodiment of the present invention.
Figure 3:
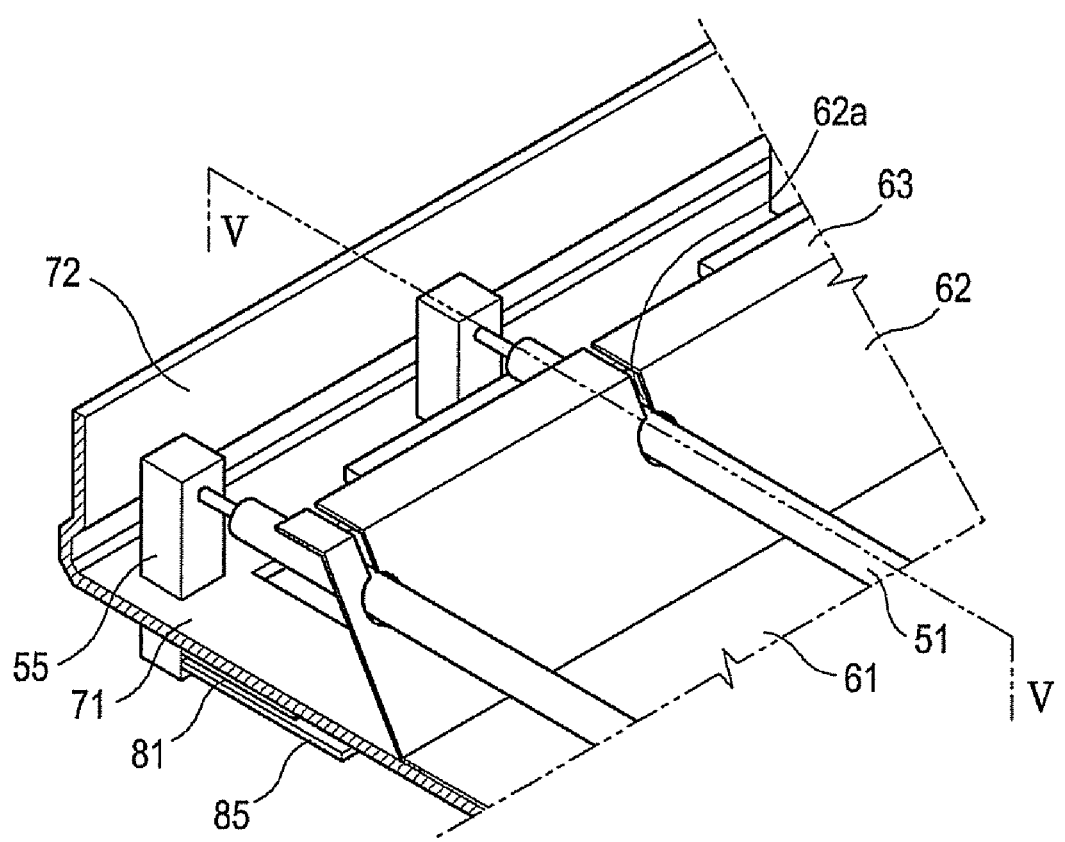
FIG. 3 is a perspective view of a portion of an assembled lower cover, lamp, and reflection plate of the LCD device according to the first exemplary embodiment of the present invention.
Figure 4:
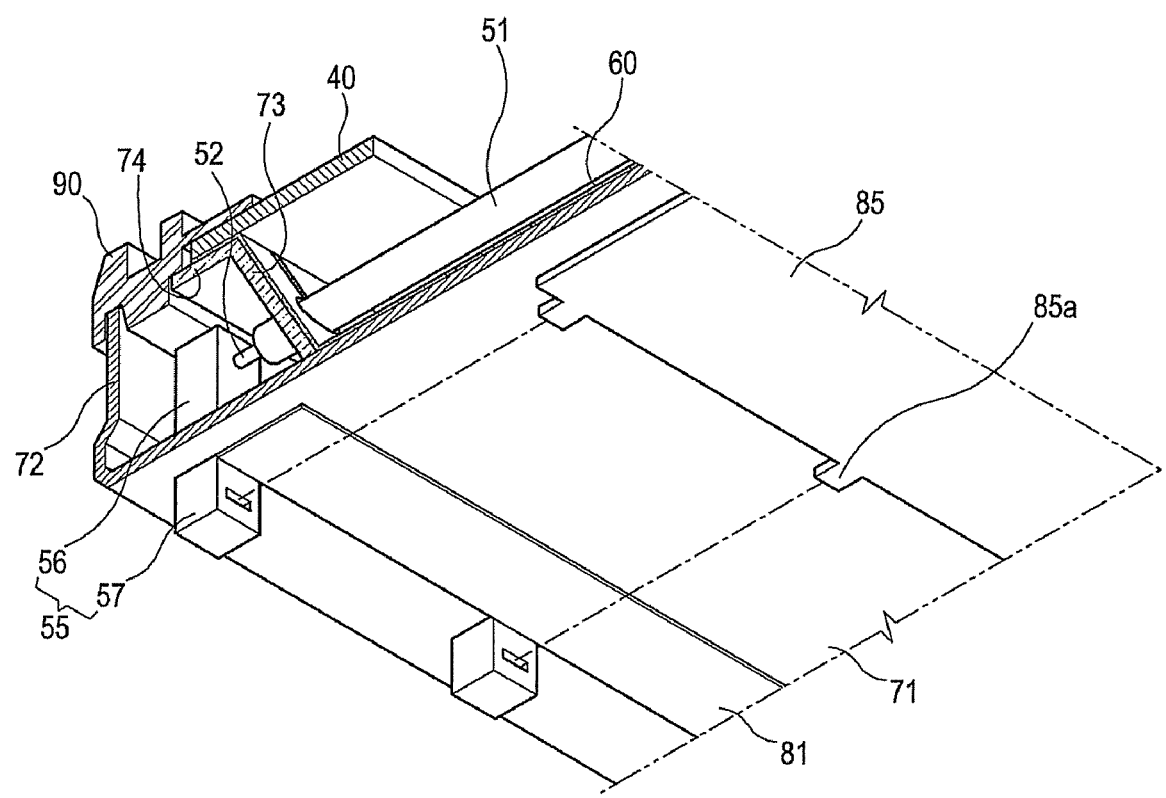
FIG. 4 is a perspective view of a portion of an assembled LCD device according to the first exemplary embodiment of the present invention.
Figure 5:
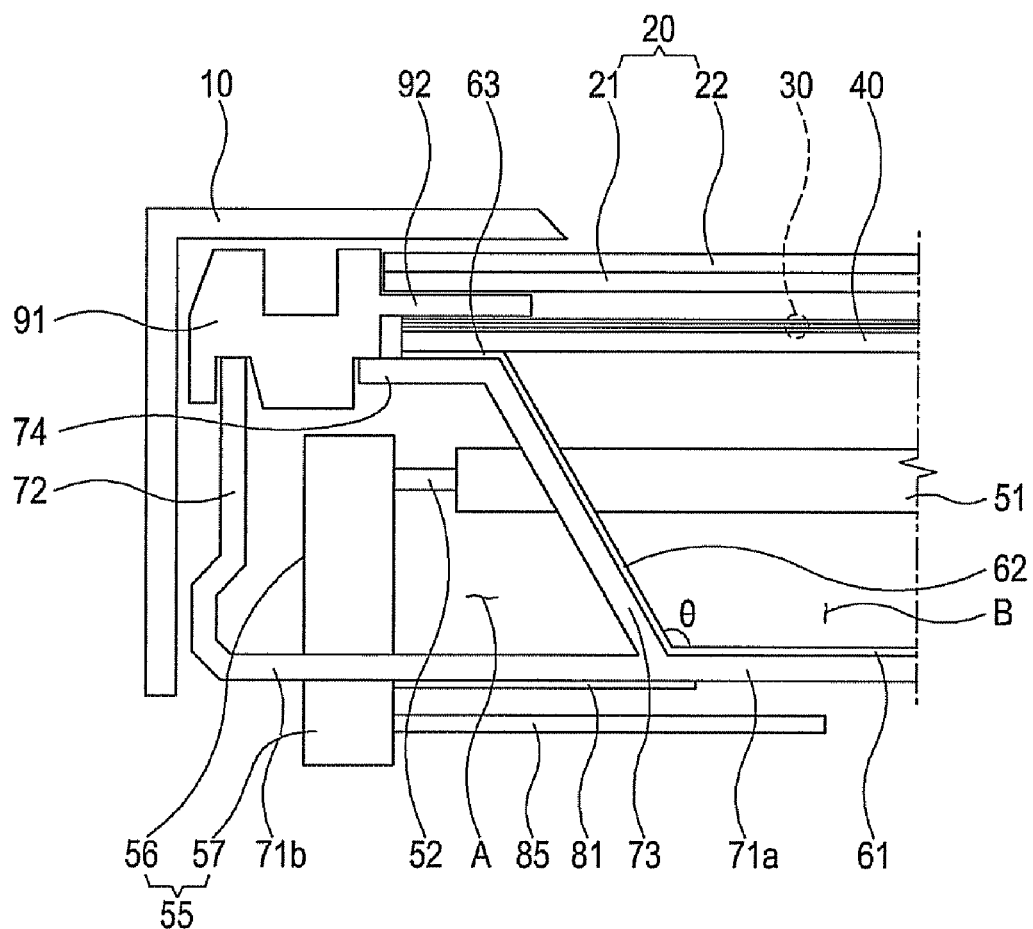
FIG. 5 is a cross-sectional view of the LCD device of FIG. 3 taken along line V-V.

Hereinafter, an LCD device according to a first exemplary embodiment of the present invention will be described with reference to FIGS. 1 to 5. FIG. 1 is an exploded perspective view of an LCD device according to a first exemplary embodiment of the present invention. FIG. 2 is a perspective view of a portion of a lower cover of the LCD device of FIG. 1. FIG. 3 is a perspective view of an assembled lower cover, lamp, and reflection plate of the LCD device of FIG. 1. FIG. 4 is a perspective view of a portion of an assembled LCD device according to the first exemplary embodiment. FIG. 5 is a cross-sectional view of the LCD device of FIG. 3, taken along lines V-V.

Referring to FIG. 1, an LCD device 1 includes an LCD panel 20, an optical film 30 disposed behind the LCD panel 20, a diffusion plate 40 disposed behind the optical film 30, a lamp 50 disposed behind the diffusion plate 40, and a reflection sheet 60 disposed behind the lamp 50. The LCD panel 20 is seated in a mold frame 90.

These components (e.g., 20, 30, 40, 50, and 60) are accommodated between an upper cover 10 and a lower cover 70. A light blocking member 81 and an inverter 85 are disposed behind the lower cover 70, and opposite end parts of the lamp 50 are connected to lamp socket 55 which, in turn, is connected with the lower cover 70.

The LCD panel 20 includes a first substrate 21 where TFTs are formed and a second substrate 22 which faces the first substrate 21. A liquid crystal layer (not shown) is disposed between the substrates 21 and 22. The LCD panel 20 forms an image thereon by adjusting the orientation of liquid crystal molecules in the liquid crystal layer. However, since the LCD panel 20 does not emit light by itself, the lamp 50 is disposed behind the LCD panel 20 to provide light thereto.

A driver 25 is provided at one side of the first substrate 21 to apply a driving signal. The driver 25 includes a flexible printed circuit board ("FPCB") 26, a driver chip 27 mounted on the FPCB 26 and a printed circuit board ("PCB") 28 connected to other side of the FPCB 26. The driver 25 shown in FIG. 1 is a chip on film ("COF") type. However, other types of drivers may be used, such as tape carrier package ("TCP") type or chip on glass ("COG") type. Alternatively, a part of the driver 25 may be formed on the first substrate 21.

The optical film 30 disposed behind the LCD panel 20 includes a diffusion film 31, a prism film 32, and a protection film 33.

The diffusion film 31 diffuses light incident through the diffusion plate 40 and prevents a bright line due to the lamp 50.

The prism film 32 includes triangular prisms formed in a predetermined arrangement thereon. The prism film 32 collects the light diffused in the diffusion film 31 perpendicularly to a surface of the LCD panel 20. Two prism films 32 may be used, and micro prisms on each of the prism films 32 form a predetermined angle with each other. Most of the light passing through the prism film 32 progresses perpendicularly, thereby forming a uniform brightness distribution.

The protection film 33 protects the prism film 32, which is vulnerable to scratching.

The diffusion plate 40 disposed below the diffusion film 31 may be made of polyethylene terephthalate ("PET") or polycarbonate ("PC"). The diffusion plate 40 may include diffusing agents scattered therein or a diffusing agent layer coated thereon. The diffusion plate 40 may be thick to provide relatively high strength, and thus a gap between the diffusion plate 40 and the reflection sheet 60 may be kept comparatively constant.

The LCD device 1 may further include a lamp supporter (not shown) to maintain the gap between the diffusion plate 40 and the reflection sheet 60.

In the first exemplary embodiment, a plurality of lamps 50 is provided and extend lengthwise in a first direction. The lamps 50 are disposed parallel with each other. The lamps 50 are disposed throughout a rear of the LCD panel 20. The lamps 50 include a lamp body 51 and an electrode 52 disposed at each of opposite end parts of the lamp body 51.

The lamps 50 may be provided as a cold cathode fluorescent lamp ("CCFL") or an external electrode fluorescent lamp ("EEFL"). Most of the lamp body 51 is disposed in a light providing space "B" (as shown in FIG. 5), which is surrounded by the diffusion plate 40 and the reflection sheet 60. The lamp electrode 52 and an end portion of the lamp 50 are disposed in an accommodating space "A" (as shown in FIG. 5) outside the reflection sheet 60. The lamp electrode 52 is connected to the lamp socket 55 to be supplied with power, which will be described further herein.

Referring to FIGS. 2 to 5, the lower cover 70 includes a first cover part 71 parallel with the LCD panel 20, a second cover part 72 bent from an end portion of the first cover part 70 perpendicularly upward, a third cover part 73 which is partially cut away from the first cover part 71 at three sides thereof (referred to as a cut-off part) and bent upward toward the second cover part 72. A fourth side of the third cover part 73 is connected to the first cover part 71. A fourth cover part 74 is bent from an end portion of the third cover part 73 that is opposite to the fourth side thereof, and extends toward the second cover part 72. The fourth cover part 74 may be parallel with the first cover part 71. The lower cover 70 may be made of metal such as aluminum or stainless steel.

Referring to FIGS. 3 and 5, the reflection sheet 60 includes a first sheet part 61 to cover the first cover part 71 of lower cover 70, a second sheet part 62 extending from the first sheet part 61 to cover the third cover part 73 of lower cover 70, and a third sheet part 63 extending from the second sheet part 62 to cover the fourth cover part 74 of lower cover 70. The first sheet part 61 covers a portion of the first cover part 71 and the third sheet part 63 covers a portion of the fourth cover part 74.

FIG. 5 is a cross-sectional view of the LCD device of FIG. 3 taken along line V-V. However, the upper cover 10, the LCD panel 20, the optical film 30, the diffusion plate 40, and the mold frame 90, which are shown in FIG. 5, are not shown in FIG. 3 for convenience of description.

The reflection sheet 60 reflects light from the lamp 50 and provides it to the diffusion plate 40. The reflection sheet 60 may be made of plastic such as polyethylene terephthalate ("PET") or polycarbonate ("PC").

The reflection sheet 60 may be adhered to the lower cover 70 by using double-sided tape.

Referring again to FIGS. 2 and 5, a structure of the lower cover 70 will now be described in detail.

The first cover part 71 includes a first sub-part 71a covered with the reflection sheet 60 and a second sub-part 71b provided between the first sub-part 71a and the second cover part 72.

The first sub-part 71a is overall rectangular-shaped, and a third sub-part 73 is disposed at an end part of the first sub-part 71a.

The second sub-part 71b extends lengthwise in a second direction which is perpendicular to the first direction and is disposed at each of opposite end portions of the lower cover 70. A cut-off part 75 of a rectangular shape is formed in the second sub-part 71b to correspond to the third cover part 73. A socket through a hole 76 on the first cover part 71 is formed between the cut-off parts 75. The hole 76 may be formed on the second subpart 71b on a region closest to the second cover part 72.

The second cover part 72 is bent from each side of the first cover part 71 and assembled with the upper cover 10. A protrusion (not shown) is formed on one of the upper cover 10 and the second cover part 72, and a groove (not shown) is formed in the other thereof to assemble the second cover part 72 and the upper cover 10.

The third cover part 73 is disposed to form an obtuse angle θ with the first sheet part 61 when viewed from a cross-sectional view. The third cover part 73 may be formed to have a rectangular shape. Alternatively, the third cover part 73 may form a right angle with the first sheet part 61.

An end portion of the third cover part 73 is connected to the first cover part 71 (i.e., the fourth side of the third cover part 73), while the opposite end portion thereof is connected to the fourth cover part 74. The lower cover 70 may be made of a metal material with high strength, and thus it is not easily deformed. In other words, an angle θ that the third cover part 73 forms with the first sheet part 61 is kept comparatively constant.

A plurality of third cover parts 73 is provided and disposed at opposite end portions of the lower cover 70 along the second direction. A lamp inserting part 77 of the lower cover 70 is formed between neighboring third cover parts 73. In an assembly process, the lamp 50 is inserted through the lamp inserting part 77, and the lamp electrode 52 is disposed in the accommodating space A between the second cover part 72 and the third cover part 73. A slit or groove 62a is provided in the second sheet part 62 to correspond to the lamp inserting part 77. The groove 62a receives the end portion of the lamp 50.

The second sheet part 62 covers the entire third cover part 73 and a portion of the lamp inserting part 77. The second sheet part 62 is formed to be wider than the third cover part 73, in order to improve reflectance of light from the light providing space B.

The fourth cover part 74 extends parallel with the LCD panel 20 and supports opposite end portions of the diffusion plate 40. As described above, since the lower cover 70 has high strength, the fourth cover part 74 supports the diffusion plate 40 stably.

Referring to FIGS. 4 and 5, the lamp socket 55 will now be described.

The lamp socket 55 is settled in the socket through the hole 76 formed in the first cover part 71. The lamp socket 55 is disposed in the accommodating space A between the second cover part 72 and the third cover part 73. The lamp socket 55 includes a socket body 56 connected to the lamp electrode 52 and an inverter connecting part 57 exposed outside the lower cover 70 through the socket through hole 76 and connected to the inverter 85. The lamp socket 55 may be made of a conductive metal.

Referring to FIG. 4, the light blocking member 81 which is made of a light blocking tape or the like is adhered to an external surface of the first cover part 71. The light blocking member 81 extends lengthwise in the second direction and covers the cut-off part 75. The light blocking member 81 isolates the inside of the lower cover 70 from the outside thereof to prevent infiltration of impurities.

Light may be generated from a portion of the lamp body 51 positioned in the accommodating space A between the second cover part 72 and the third cover part 73. This light may not be directed to the diffusion plate 40 but leak to the rear of the LCD device 1 through the cut-off part 75, which is reduced by the light blocking member 81.

A portion of the lamp body 51 positioned in the accommodating space A may be low in brightness as compared with the portion positioned in the light providing space B. In the present exemplary embodiment, the lamp body 51 low in brightness is disposed in the accommodating space A, thereby improving brightness uniformity of the LCD device 1.

Alternatively, the light blocking member 81 may be disposed in an inside surface of the first cover part 71 and provided plurally to correspond to each cut-off part 75.

Referring to FIGS. 1 to 4, a pair of inverters 85 is provided on the external surface of the first cover part 71. A protrusion 85a is formed on the inverters 85. The protrusion 85a is inserted into the inverter connecting part 57 of the lamp socket 55.

The LCD device 1 may further include an inverter cover (not shown) to protect the inverter 85.

Referring to FIGS. 1 and 5, the mold frame 90 includes a first mold part 91 of a rectangular frame shape and a second mold part 92 which extends from the first mold part 92 inward.

The first mold part 91 is seated on the second cover part 72 and prevents the LCD panel 20 from moving in a surface direction. The second mold part 92 extends parallel with the LCD panel 20 and supports an end portion of the LCD panel 20.

In the first exemplary embodiment, the diffusion plate 40 is supported by the lower cover 70, and light from the lamp 50 is reflected on the reflection sheet 60 supported by the lower cover 70 to progress to the diffusion plate 40.

Accordingly, a side mold which is conventionally used to support the diffusion plate 40 and to reflect the light from the lamp 50 can be omitted, thereby simplifying a configuration of the LCD device 1. Further, yellowing which results from heat applied to a plastic side mold is prevented.

In an exemplary embodiment, the components may be assembled as follows: the lower cover 70 and the reflection sheet 60 are assembled; the lamp 50 is assembled therewith; and the diffusion 40 is disposed on the lower cover 70. As compared with a conventional assembly process, a process of assembling the side mold after the lamp 50 is assembled is omitted, thereby simplifying the assembly process. If a lamp supporter is used, it is settled into the lower cover 70 before the lamp 50 is assembled.

When the lamp 50 is driven, heat is generated in the lamp 50, particularly in the lamp electrode 52. If the heat is not properly radiated, the lamp 50 rises in temperature, and accordingly brightness of the lamp 50 decreases.

According to the first exemplary embodiment, as the cut-off part 75 is provided in the accommodating space A where the lamp electrode 52 is disposed, the heat from the lamp electrode 52 is efficiently radiated. The lamp electrode 52 is covered with the lower cover 70 of metal with high thermal conductivity, which is also helpful to radiate heat efficiently.

Efficiency of heat radiation in the LCD device 1 according to the first exemplary embodiment is obtained from an experiment, and results therefrom will be described with reference to FIG. 6. The lamp extends in a transverse direction in FIG. 6.

In the experiment, twelve lamps are used and an outside temperature is maintained at 24° C. Under this condition, brightness is obtained at nine points with the conventional side mold and without a side mold, as in the present exemplary embodiment.

In each box in FIG. 6, the numerical value before the arrow represents brightness of the conventional LCD device and the numerical value after the arrow represents brightness of the LCD device according to the present invention.

As a result, brightness is improved at all the points as shown in FIG. 6, especially, at opposite end portions of the lamp. Brightness is expressed in terms of nit.

Figure 7:
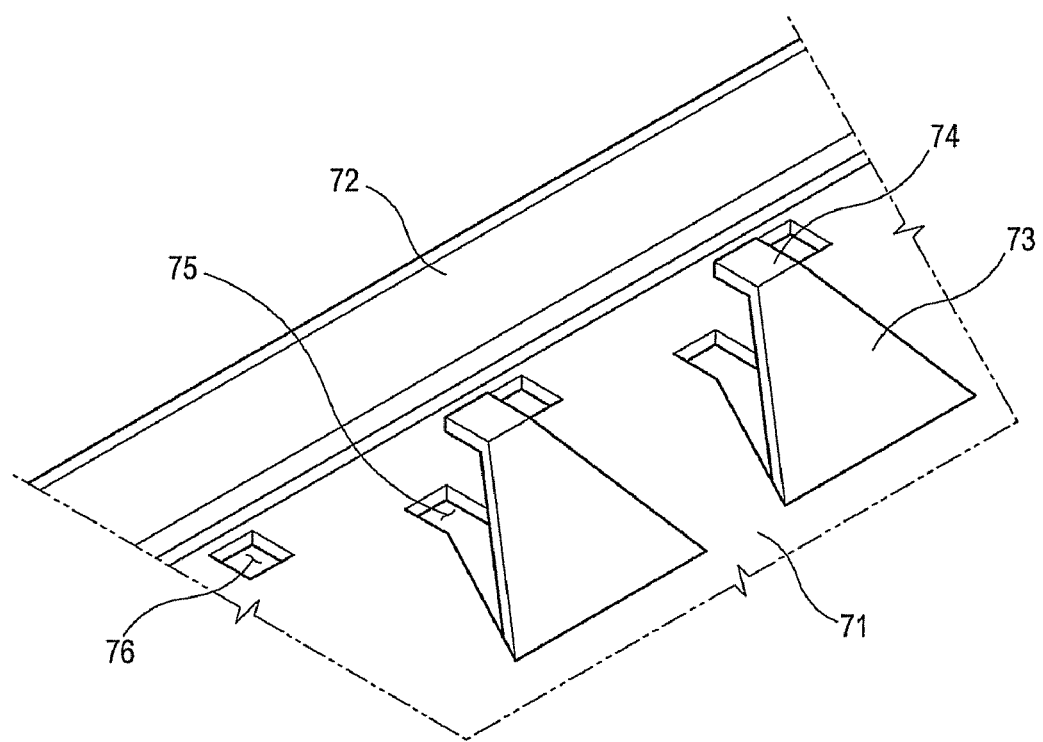
FIG. 7 is a perspective view illustrating a portion of a lower cover for an LCD device according to a second exemplary embodiment of the present invention.
Figure 8:
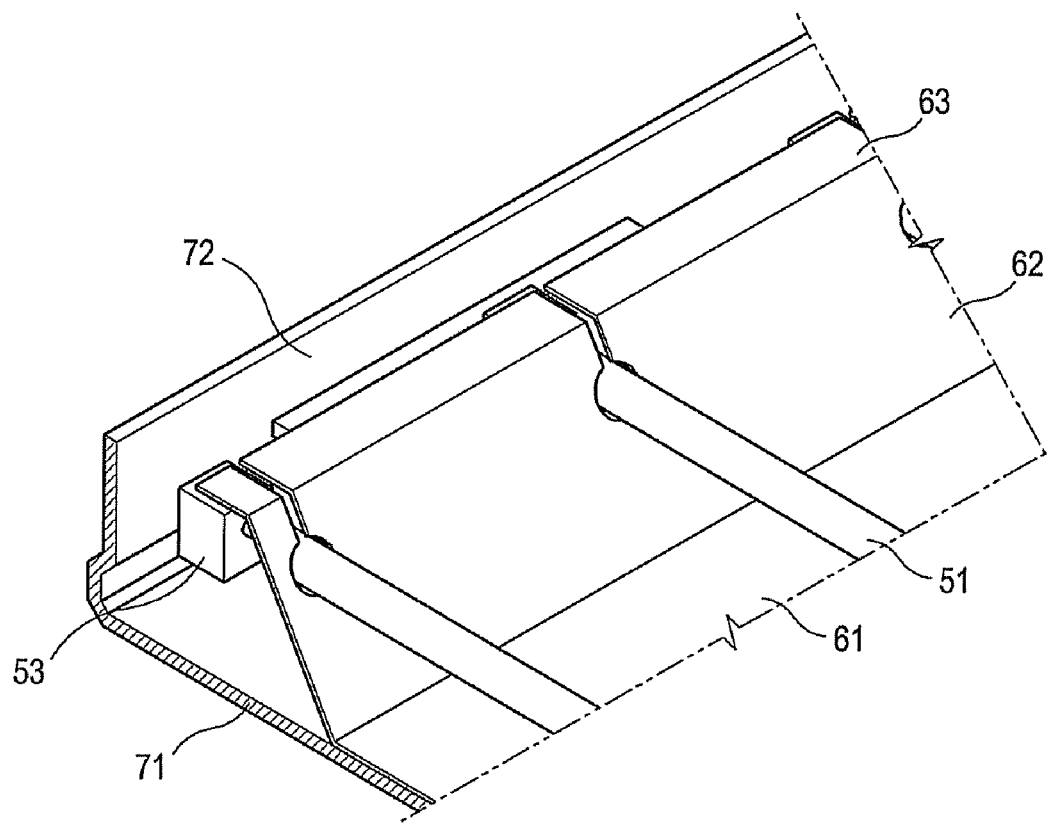
FIG. 8 is a perspective view illustrating a portion of an assembled lamp, reflection plate, and lower cover for an LCD device according to a third exemplary embodiment of the present invention.

A second exemplary embodiment of the present invention will be described with reference to FIG. 7. FIG. 7 is a perspective view illustrating a portion of a lower cover for an LCD device according to a second exemplary embodiment of the present invention, and FIG. 8 is a perspective view illustrating a portion of an assembled lamp, reflection plate, and lower cover for an LCD device according to a third exemplary embodiment of the present invention.

In the second exemplary embodiment, a third cover part 73 is trapezoid-shaped, and a fourth cover part 74 is rectangular-shaped. A reflection sheet 60 has a similar shape to one in the first exemplary embodiment, and thus reflectance is the same as one in the first exemplary embodiment.

The third cover part 73 may have various shapes.

A third exemplary embodiment of the present invention will be described with reference to FIG. 8.

In the third exemplary embodiment, an electrode supporting part 53 is provided at each of opposite end portions of a lamp 50, and a lamp electrode 52 is disposed inside the electrode supporting part 53. A wire (not shown), which extends from the electrode supporting part 53, is connected to an inverter 85.

As described above, the present invention provides a LCD device with a simple configuration.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display device comprising:
    a liquid crystal display panel;
    a plurality of light sources disposed behind the liquid crystal display panel; and
    a cover which accommodates the light sources,
    the cover comprising:
        a first cover part parallel with the liquid crystal display panel and disposed behind the light sources;
        a second cover part bent upward from an end portion of the first cover part;
        a third cover part including a portion of the first cover part partially cut away from and bent upward from the first cover part which faces the light sources, and
        a fourth cover part bent from an end portion of the third cover part, extending toward the second cover part, and parallel with the liquid crystal display panel; and
    an end portion of the light sources being disposed between the second cover part and the third cover part.

2. The liquid crystal display device according to claim 1, further comprising a reflection sheet which comprises a first sheet part to cover at least a portion of the first cover part and a second sheet part to cover at least a portion of the third cover part.

3. The liquid crystal display device according to claim 1, wherein the third cover part is trapezoid shaped, and the fourth cover part is rectangular-shaped.

4. The liquid crystal display device according to claim 1, further comprising an optical plate disposed between the liquid crystal display panel and the light sources, wherein the fourth cover part supports an end portion of the optical plate.

5. The liquid crystal display device according to claim 4, wherein the reflection sheet further comprises a third sheet part extending from the second sheet part and disposed between the fourth cover part and the optical plate.

6. The liquid crystal display device according to claim 1, wherein a plurality of third cover parts are provided and disposed in a transverse direction to a lengthwise direction of the light sources, and the light sources are disposed between neighboring third cover parts.

7. The liquid crystal display device according to claim 1, wherein a cut-off part is formed in the first cover part to correspond to the third cover part.

8. The liquid crystal display device according to claim 7, further comprising a light blocking member adhered to a rear surface of the first cover part to cover the cut-off part.

9. The liquid crystal display device according to claim 1, wherein the third cover part forms an obtuse angle with the first cover part.

10. The liquid crystal display device according to claim 1, further comprising a light source socket which is connected to the end portion of the light sources to transmit power and comprises at least a portion disposed between the second cover part and the third cover part.

11. The liquid crystal display device according to claim 10, further comprising an inverter disposed on a rear surface of the first cover part and a socket through a hole which is adjacent to the cut-off part and formed in the first cover part,
    wherein the light source socket comprises a socket body connected to the end portion of the light sources and an inverter connecting part exposed outside the cover through the socket through the hole and connected to the inverter.

12. The liquid crystal display device according to claim 4, further comprising a mold frame which comprises a first mold part supported by the second cover part and a second mold part extending from the first mold part over the optical plate, wherein an end portion of the liquid crystal display panel is seated on the second mold part.

13. A liquid crystal display device comprising:
    a liquid crystal display panel;
    a plurality of light sources disposed behind the liquid crystal display panel;
    an optical plate disposed between the liquid crystal display panel and the light sources;
    a cover which accommodates the light source and supports an end portion of the optical plate; and
    a reflection sheet which covers the cover facing the optical plate,
    wherein the cover comprises:
        a first cover part parallel with the liquid crystal display panel and disposed behind the light sources;
        a second cover part bent upward from an end portion of the first cover part;
        a third cover part including a portion of the first cover part partially cut away from and bent upward from the first cover part which faces the light sources: and
        a fourth cover part bent from an end portion of the third cover part, extending toward the second cover part, and parallel with the liquid crystal display panel.

14. The liquid crystal display device according to claim 13, wherein
    an end portion of the optical plate is seated on the fourth cover part.

15. The liquid crystal display device according to claim 13, wherein a plurality of third cover parts are provided and disposed in a transverse direction to a lengthwise direction of the light sources, and the light sources are disposed between neighboring third cover parts.

16. The liquid crystal display device according to claim 13, wherein a cut-off part is formed in the first cover part to correspond to the third cover part.

17. The liquid crystal display device according to claim 16, further comprising a light blocking member adhered to a rear surface of the first cover part to cover the cut-off part.

18. The liquid crystal display device according to claim 14, wherein the third cover part forms an obtuse angle with the first cover part, and the liquid crystal display device further comprises a light source socket which is connected to the end portion of the light sources to transmit power and comprises at least a portion disposed between the second cover part and the third cover part.

19. A liquid crystal display device comprising:

a liquid crystal display panel;

a plurality of light sources disposed behind the liquid crystal display panel; and a cover which accommodates the light sources, the cover comprising:

a first cover part parallel with the liquid crystal display panel and disposed behind the light sources;

a second cover part bent upward from an end portion of the first cover part; and a third cover part including a portion of the first cover part partially cut away from and bent upward from the first cover part which faces the light sources, and an end portion of the light sources being disposed between the second cover part and the third cover part, wherein the third cover part forms an obtuse angle with the first cover part.

* * * * *